United States Patent [19]

Tastet

[11] Patent Number: 4,742,941

[45] Date of Patent: May 10, 1988

[54] AUTOMATIC VOLUMETRIC DOSAGE DISPENSER FOR PRODUCTS HAVING A VARYING DEGREE VISCOSITY

[76] Inventor: Claude Tastet, Ilot des Bordes, 64940 Moumor, France

[21] Appl. No.: 740,008

[22] Filed: May 31, 1985

[51] Int. Cl.[4] .............................................. A21C 5/00
[52] U.S. Cl. .................................. 222/309; 222/334; 222/340; 222/372; 222/381; 222/575; 425/238
[58] Field of Search ............... 222/309, 372, 381, 334, 222/340, 575; 425/238; 417/490, 900

[56] References Cited

U.S. PATENT DOCUMENTS

| | | | |
|---|---|---|---|
| 2,004,161 | 6/1935 | Fausel | 222/381 X |
| 2,854,170 | 9/1958 | Borgardt et al. | 222/381 X |
| 3,101,161 | 8/1963 | Ivarson | 222/381 X |
| 3,218,994 | 11/1965 | Valentyne | 222/381 X |

FOREIGN PATENT DOCUMENTS 599773 3/1948 United Kingdom .

Primary Examiner—Joseph J. Rolla
Assistant Examiner—Frederick R. Handren
Attorney, Agent, or Firm—Erwin S. Teltscher

[57] ABSTRACT

A dispenser of products having a varying degree of viscosity includes a longitudinal and hollow body of circular cross-section, upon which there is mounted a funnel. The hollow body contains in a rear part thereof a piston which is arranged to push forward an assembly of movable elements including a cross-piece, a piston, a sleeve and a resilient split ring, so as to expel a product dose through a cone formed with holes and loosely lined in the interior thereof with an elastic membrane. The movable elements are returned to their initial position by the force of a spring. The cone is extended by a pouring spout, which in turn carries a tube provided with a distributor cone.

7 Claims, 4 Drawing Sheets

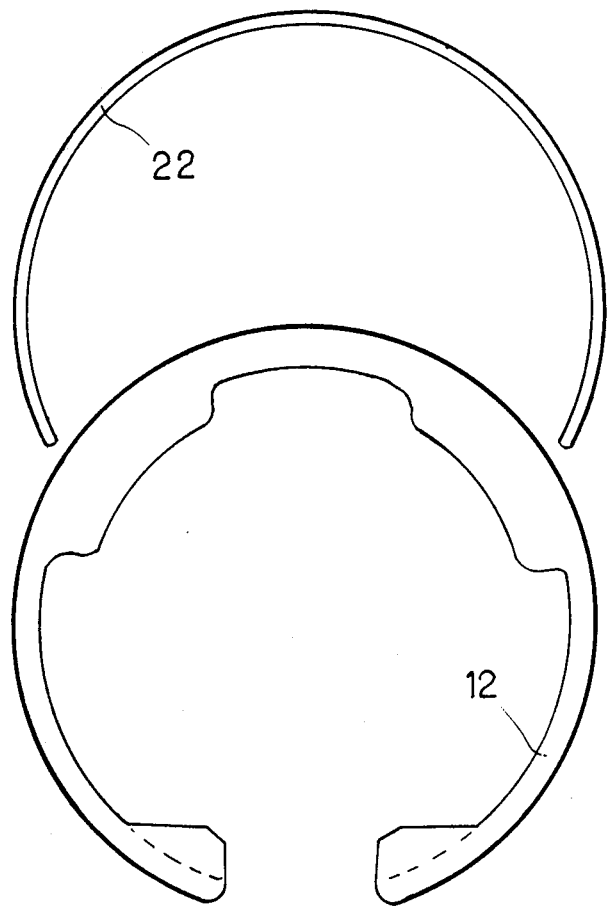
FIG. 5
FIG. 4
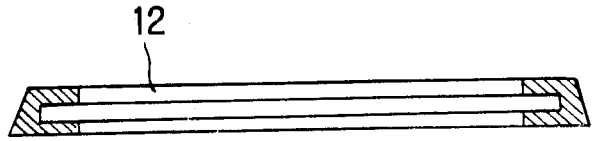
FIG. 3

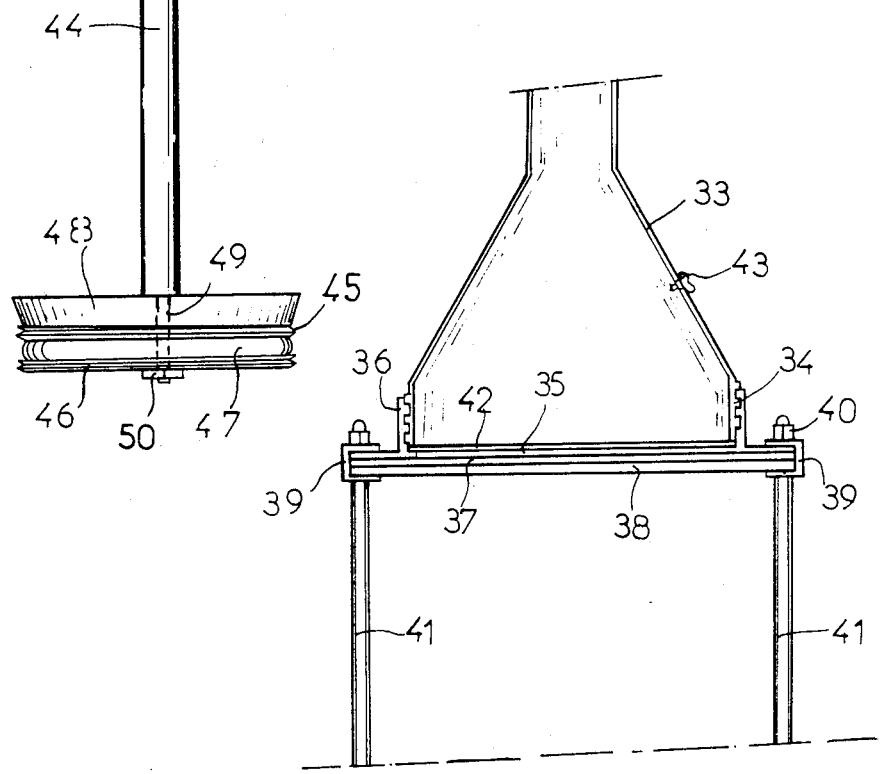

AUTOMATIC VOLUMETRIC DOSAGE DISPENSER FOR PRODUCTS HAVING A VARYING DEGREE VISCOSITY

FIELD OF THE INVENTION

The present invention relates to volumetric dosage dispensers for products having a varying degree of viscosity, and particularly for products utilized in the food industry.

BACKGROUND OF THE INVENTION

There exist dosage dispensers for injecting products of a varying degree of viscosity into confectionary and pastry products. Dispensers of the prior art generally include a movable piston/cylinder or piston/sleeve mechanism permitting the travel and injection of dosages of viscous products. However, the movement of the cylinder or sleeve is accomplished independently from that of the piston, therefore necessitating the use of two arms or jacks, which increases considerably the cost of construction. Furthermore, certain dispensers have the movable part of the piston-cylinder acted upon by an arm articulatedly associated with a cam. This cumbersome configuration results in wear and tear at a number of points vulnerable to wear, and therefore increases the risk of breakage of the dispenser.

The prior art is represented by the following examples:

Tito Guisti et al, British Pat. GB-A-No. 599773, describes a dispenser in which a funnel is positioned on a cylindrical body in which there slides a single longitudinal member, which simultaneously ejects the viscous product and closes a supply opening.

P. H. Valentyne, U.S. Pat. No. 3,218,994, relates to a funnel secured to a cylindrical body, in which there is movable a piston and a sleeve acted upon by an independent arm or jack, and in which the length of the sleeve is longer than the length of the cylindrical body.

Henry Borgart et al, U.S. Pat. No. 2,854,170, teach a dispenser with a sleeve slidably disposed in a cylindrical body for sealing the opening of a funnel disposed thereabove, and wherein the sleeve is acted upon by an articulated arm. The viscous product is ejected by a piston, which, in turn is driven or moved by a second articulated arm.

N. S. M. Ivarson, U.S. Pat. No. 3,101,161 describes a cylindrical body enclosing a sleeve, pistons, and a spring. The cylindrical body provides at each extremity thereof for a region on which pressure can be exerted. The initial position (in which the piston is completely pressed into the cylindrical body, and the ring is pressed against the advancing piston) is maintained by pressure supplied to the interior of the cylinder. As the upper pressure contact closes, and the lower pressure contact correspondingly opens, the sleeve advances under the action of the pressure. Thereafter, pressure is exerted on the upper contact, which in turn, urges the piston downwardly, thereby expelling the product.

SUMMARY OF THE INVENTION

It is an object of the present invention to obviate or at least minimize these disadvantages, namely wherein the piston and the sleeve are operated by the same parts, thereby reducing cost and avoiding the cumbersome configuration of the prior art dispensers.

This object is attained by the device having a round, hollow, longitudinal body, positionable on a table, and having a funnel mounted thereon. The body of the dispenser is closed rearwardly by an assembly of movable elements including a sleeve, and pistons separated from one another by a cross-piece, while at the rear end of the movable assembly there is provided a closing stopper on which there is supported one end of a helical compression spring, whose other extremity is enclosed in a sheath; a closure member is threaded into the sheath at a selectable depth so as to control the stroke length of the pistons, and thus the effective dosage of the product. The portion of the dispenser ahead of, or frontwardly of the hollow, longitudinal body contains a joint, and a cone projects further outwardly from the longitudinal, hollow body, terminating, in turn, in a spout. A rubber tube or duct may be connected to the spout, on which there may be disposed a distributor or pouring cone.

One of the principal characteristics of the invention resides in the means for operating the moving parts, in as much as compressed air exerts pressure on the principal piston, which in turn advances, pushing ahead thereof the cross-piece, the clip, a secondary and smaller piston, the sleeve and the shaft on which these elements are mounted. The shaft itself extends rearwardly, while a compression spring is interposed between the stopper of the longitudinal body, and a closure member threaded into a sheath. Furthermore, the different moving parts are designed to be operatively watertight wherever required.

Near the discharge region of the dispenser a certain amount of the viscous product is isolated and pushed into the cone; as the cone is already filled with the product, a quantity equal to that certain amount of the product is then discharged from the end of a pouring or distributor cone. Thereafter, when during the forward travel of the shaft the sheath taken along by the shaft makes contact with the stopper, the compressed air supply to the dispenser is thereby shut off, so that the compression spring reverts to its initial unstressed state, thereby taking the shaft and the components mounted thereon along in a rearward direction to their initial position.

Another improvement concerns the cone positioned in front of the body. The cone is formed with openings and is loosely lined on its interior with a rubber membrane, which bulges toward the center when the moving parts retract, thus compensating for the part-vacuum or void resulting from the return travel of the shaft and components mounted thereon; this in turn prevents rearward suction of any material located in the forward section of the device forwardly of the rubber tube.

The novel features which are considered as characteristic of the invention are set forth in particular in the appended claims. The invention itself, however, both as to its construction and method of operation, together with additional objects and advantages thereof, will best be understood from the following description of the specific embodiments read in conjunction with the accompanying drawing.

BRIEF DESCRIPTION OF THE DRAWING

In the drawing:

FIG. 3 is a substantially circular clip in elevational cross-section employed in the dispenser, its material having the required modulus of elasticity for its intended use, FIG. 4 is an elevation view of the circular clip when a clip-stressing or clip-expanding device is additionally required to cooperate with the clip, FIG. 5 is an elevation view of the clip-stressing or clip-expanding device in the form of a substantially circular clip spring required when the modulus of elasticity of the material of the substantially circular clip is insufficient for the purpose intended in the dispenser, FIG. 6 is a large-scale elevational cross-sectional view of the distributing cone, and FIG. 7 is a large-scale elevation view of a funnel-removing device.

DESCRIPTION OF THE PREFERRED EMBODIMENT

Figure 1:
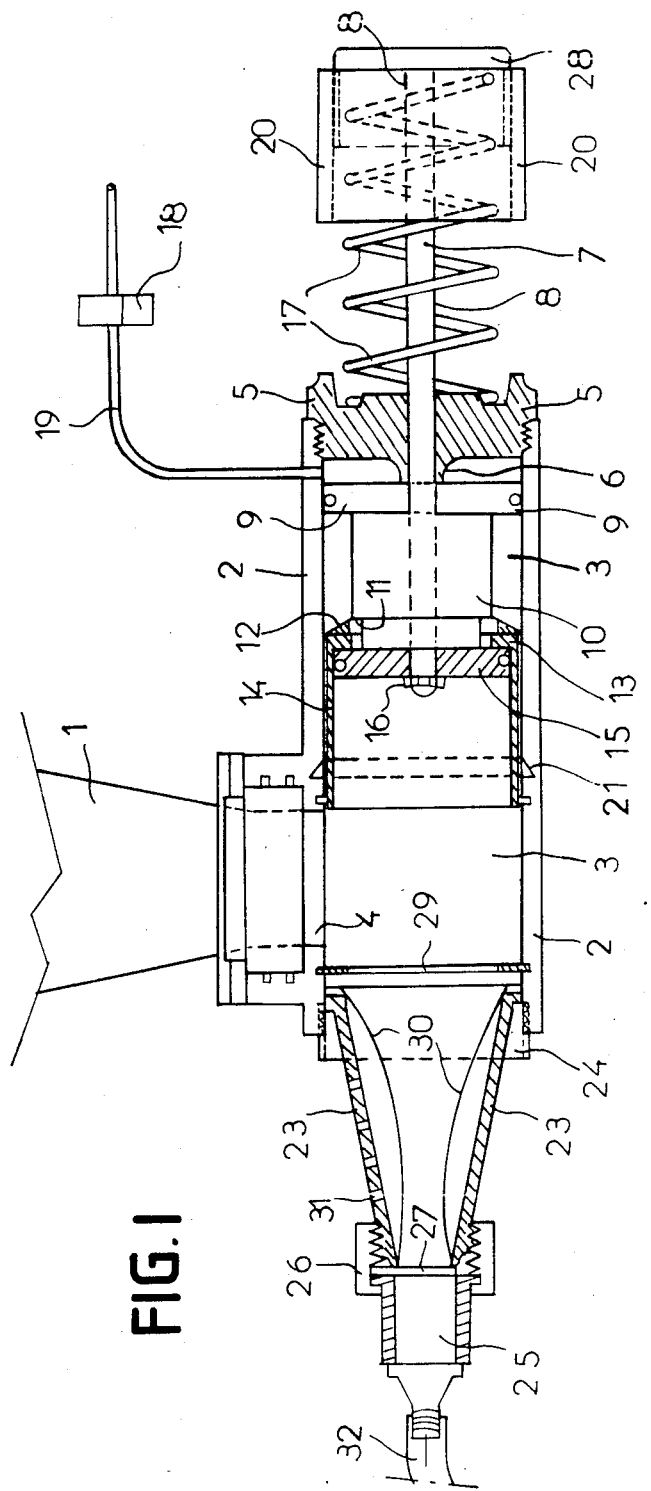
FIG. 1 is a longitudinal cross-section of the dispenser in elevation, with the dosage-moving elements at rest in their initial position.

As shown in the drawing, a funnel 1 in the shape of a truncated cone is located at its smallest diameter on a horizontally disposed and hollow body 2 of the dispenser; the funnel 1 communicates with a longitudual chamber 3 through an aperture or passage 4, which is primarily designed for the efficient passage and/or descent of a (non-illustrated) viscous product. At the rear end of the body 2 (taking into account that the vertical axis of the funnel 1 defines the front end of the body 2 with respect to its rear end) there is threaded onto the inner circumference of the rear end of the body 2 a stopper 5; the stopper 5, which has a shoulder 6, is formed with a central hole 7 for passage of a shaft 8. A large piston 9 is affixed to the shaft 8 further inwardly in the chamber 3 and abuts the shoulder 6 in its rearmost position, as can be seen from FIG. 1; juxtaposed with the piston 9 is a cross-bar 10, which in turn is formed with a shoulder 11. As seen in FIG. 1, a compressed resilient and substantially circular clip or split ring 12 abuts an inwardly bent flange 13 of the rear end of a cylindrical piston or sleeve 14, in which, in turn, slides a secondary, smaller piston 15 affixed onto the shaft 8 by a screw 16. The other end of the sleeve 14 is adjacent the aperture 4 of the funnel 1.

When compressed air is passed through a conduit 19 to the annular chamber between piston 9 and stopper 5, by actuation of a pedal 18, the large piston 9 slides along the interior lining of the chamber 3, and urges all the movable parts positioned on the shaft 8 frontwardly. The movable parts are the cross-bar 10, the substantially circular clip or split ring 12 retained thereon, the sleeve 14, as well as the secondary and smaller piston 15. As can be seen from FIG. 2, the sleeve 14 acts as a passage shut-off means. The shaft 8 also extends rearwardly from the rear of the stopper 5, passing through a resilient compression spring 17. The resilient compression spring 17 is, in turn, surrounded by a sheath 20, and the sheath 20 receives interiorly a closure member 28 which is attached to the rearward end of shaft 8.

Figure 2:
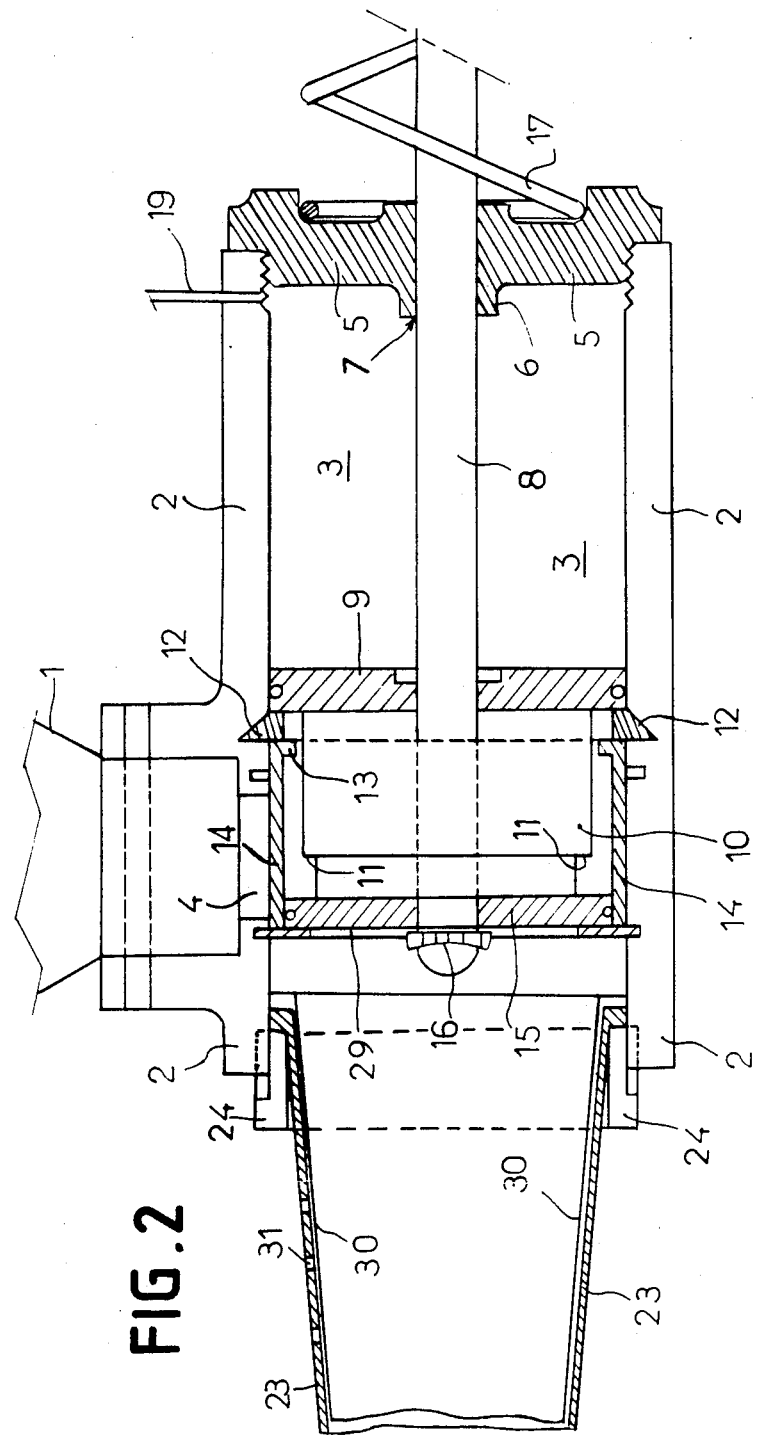
FIG. 2 is a partial longitudial cross-section of the dispenser, with the dosage moving elements at a forward and product-ejecting position.

The closure member 28 is threaded at a selectable length onto the interior thread of the sheath 20, thus in turn acting as control means for controlling the effective stroke length of the shaft 8. When the large piston 9 urges the movable parts, as defined above, and positioned in front thereof, forwardly, the substantially circular resilient clip or split ring 12 initially abuts in its compressed state the shoulder 11 of the cross-bar 10 and the inwardly bent apertured flange 13 of the sleeve 14. This occurs, however, only up to the stage in forward travel of the substantially circular clip or split ring 12, when it engages a circular throat 21 in the lining of the chamber 3; the circular throat 21 is conically diverging in the direction of advancement of the piston 9 towards a discharge opening of the dispenser. As the outermost diameter of the throat 21 is larger than that of the inner diameter of the chamber 3, this shape of the throat 21, in turn, permits the substantially circular clip or split ring 12 to expand radially, due to the radially outward urging of the force of a clip spring 22 associated therewith, (as seen in FIG. 5), so that it then no longer abuts the shoulder 11 of the cross-bar 10, but is arrested in its forward movement by the throat 21. This train of events also stops the sleeve 14, because the stroke of the above-defined forward travel causes the front end of the sleeve 14 to abut a circular ring 29, as seen in FIG. 2. By this radial expansion the substantially circular clip or split ring 12 frees the cross-bar 10 from axial contact therewith. This action permits the large piston 9 to continue on its forward travel, and thus propels a (non-illustrated) dosage held isolated in the sleeve 14 by means of a secondary and smaller piston 15 forwardly toward a cone 23. The cone 23 is secured to the front of the body 2 by the means of a tightening ring 24. At the end of the cone 23 there is located a nozzle 25, which is held thereonto by means of a tightening ring 26. A passage shut-off means, such as a one-way circular valve 27 is disposed between the cone 23 and the nozzle 25. Thus the functional combination of the shaft 8, the compression spring 17, the piston 9, the cross-piece 10, the sleeve 14 with its apertured flange 13, the piston 15, the split ring 12, and the circular throat 21, can be considered as product drive means.

After the release of the pedal 18,—which may be alternately and automatically accomplished, for example, by the sheath 20 impinging on the stopper 5 during the forward travel of the shaft 8 to its frontmost position—the helical compression spring 17 expands rearwardly to resume its initial state. The compression spring 17 causes the recoil of the sheath 20, as well of the shaft 8, whose rearward extremity has the closure member 28 attached thereto. It will be seen that the screw 16 at the front end of the shaft 8 holds the second, smaller piston 15. The second, smaller piston 15, as a result of abutting the flange 13 of the sleeve 14, takes along the sleeve 14, when the shaft 8 returns to its initial position, being drawn thereto by the force of the compression spring 17. On the other hand, the inwardly bent apertured flange 13 induces the substantially circular clip or split ring 12 to be released from its notched position in the throat 21 of the chamber 3, and the smaller diameter of the interior lining of the chamber 3 compresses it, so as to abut the shoulder 11, as seen in FIG. 1.

A latex membrane 30 is formed in the interior of the cone 23; the cone has openings 31, permitting the membrane 30 to bulge towards the center by atmospheric pressure, thereby compensating for the momentary part-vacuum behind the moving parts on the return travel of the shaft 8; simultaneous withdrawal in a rearward direction of the sleeve 14 re-establishes communication of the funnel 1 with the chamber 3, so as to cause the opening of aperture 4.

In order to operate at the proper spacing from the dispenser, the nozzle 25 is coupled to a rubber conduit 32 fitted with a distributor cone 33 at its end, as shown in FIG. 6. The cone 33 is provided at its widest part with a thread 34, onto which there is threaded a grating 35 by means of a tube 36 extending at right angles from the grating 35. Below the grating 35 there are juxtaposed with one another two other secondary gratings 37 and 38 so as to restrict the openings on the first grating 35. The gratings 37 and 38 are held on the grating 35 by means of a U-shaped bracket 39.

The bracket 39, in turn, surrounds the three gratings on three sides, permitting through its open or fourth side a change or further retraction of the gratings 37 or 38. Once positioned by the bracket 39, the assembly of the gratings is further reinforced securely by a plurality of screws 40, such as three screws, and wherein the screws 40 extend to support respective stems 41. The stems 41, in turn, may be positioned on any appropriate and (non-illustrated) surface. A plate 42 is slidable above the grating 35 to reduce the width of the opening through which the viscous product passes or falls. The cone 33 is also provided with a purifier 43.

At the end of an operating day, the funnel 1 may be removed together with any remaining product retained on it by means of a stem 44, which is provided at its end with two circular plates 45 and 46 (see FIG. 7), and between which there is positioned a watertight joint 47.

The stem 44 is attached to the periphery of the bottom of funnel 1 by means of threaded plates 45 and 46. The height of the thread is limited by the bell-mouthed skirt 48 of the upper plate 45. The plates 45 and 46, as well as the joint 47 are threaded onto a stem 49 of smaller diameter than the stem 44, and thus extend the stem 44. The plates 45 and 46, and the joint 47 are secured to the stem 49 by a threaded nut 50. A spherical gripping handle 51 is threaded onto the upper end of the stem 44. With the stem threaded into the funnel, the stem may be used to separate the funnel from the funnel from the hollow body 2. Thus the functional combination of the handle 51, the stem 44, and the plates 45 and 46 can be considered as a product remnant remover.

The present invention is particularly useful for the pastry industry, but may also be utilized for any other and similar industries.

While the invention has been illustrated in a preferred embodiment, it is not to be limited to the structures shown, since many variations thereof will be evident to one skilled in the art, and are intended to be encompassed in the present invention as set forth in the following claims.

I claim:

1. A dispenser for automatic dosage of products having a varying degree of viscosity, comprising in combination
    a hollow body defining a longitudinal chamber, having a discharge opening near one end thereof, and being provided with closing means including a stopper formed with a central hole at the other end of said longitudinal chamber,
    a funnel mounted on top of said body and adapted to receive said products, said funnel selectably communicating with said chamber through a passage formed in said hollow body,
    product drive means travelling reciprocally in said longitudinal chamber for discharging a product received therein from said funnel through said discharge opening during forward travel of said product drive means towards said discharge opening,
    limiting means for limiting the forward and reverse travel of said product drive means,
    control means for controlling the forward and reverse travel of said product drive means,
    passage shut-off means for closing said passage as said product is being discharged through said discharge opening
    said product drive means including
        a shaft including a remote end portion, said shaft being slidably received in the central hole of said stopper;
        a compression spring interposed between said stopper and said end portion and biasing said shaft toward a retracted initial position,
        a first piston secured to said shaft, reciprocally movable along a stroke in said chamber, and abutting said stopper in said initial position, said chamber having a predetermined inner diameter,
        a cross-bar having a width smaller than said predetermined inner diameter of said chamber, being formed with a shoulder and abutting said first piston with a side thereof facing said remote end portion,
    said passage shut-off means comprising a sleeve slidable in said chamber and being formed with an inwardly bent apertured flange facing said remote end portion, said apertured flange being slidable over said cross-bar, and
    a second piston secured to an end of said shaft facing said discharge opening, being slidable within said sleeve, and abutting said apertured flange with a side thereof facing away from said discharge opening,
    a resilient split ring expandable in a radial direction, releasably engaging said cross-bar at said shoulder, and making contact with an inner wall of said chamber when said shaft is in said initial position, said apertured flange abutting said split ring in said initial position, and
    a circular throat formed in said chamber conically diverging towards said discharge opening, and further comprising
    stop means disposed within said chamber near said discharge opening, but allowing passage of said product therethrough,
    whereby, upon said control means exerting a force on said first piston in a direction towards said discharge opening and against the force of said spring, said pistons, said cross-bar and said sleeve travel towards said discharge opening until said sleeve impinges on said stop means, said sleeve acting as said passage shut-off means, while said split ring expands radially into said throat freeing said pistons for movement with respect to said inwardly bent apertured flange in a direction towards said discharge opening,
    while, upon said force of said control means being removed from said piston, said spring retracts said shaft to said initial position.

2. The dispenser as claimed in claim 1, wherein said remote end portion includes a sheath surrounding said spring, and a closure member attached to said shaft and threadable into said sheath at an end thereof remote from said discharge opening, said closure member being threadable into said sheath at a variable length, the sheath determining the length of the stroke of said first piston.

3. The dispenser as claimed in claim 1, further comprising a cone releasably securable to said body near said discharge opening, and having a wide side thereof facing said stop means, a membrane extending along an inner surface of said cone, the cone being formed with a plurality of openings, whereby, upon a momentary part-vacuum being formed within said cone upon retraction of said shaft to said initial position, said membrane bulges towards a center of said cone due to atmospheric pressure being exerted thereon through said openings.

4. The dispenser as claimed in claim 3, further comprising a nozzle disposed near a narrow side of said cone, a tightening ring formed with a thread being threaded onto said nozzle and said cone so as to hold them to one another, and a one-way valve disposed between said cone and said tightening ring for permitting outward passage of said product.

5. The dispenser as claimed in claim 4, further comprising a distributor cone attachable to said pouring nozzle, a first grating formed with openings and releasably secured to said distributor cone near a widest side thereof, and two secondary gratings juxtaposed with said first grating and with one another for restricting the openings of said first grating.

6. The dispenser as claimed in claim 5, further comprising at least one U-shaped bracket surroundingly holding said gratings to one another.

7. In combination with the dispenser as claimed in claim 1, further comprising a funnel and product remnant remover for removing said funnel from said body, said remover including handle, a stem attached to said handle near one end of said stem, two juxtaposed plates attached to said stem near the other end of said stem, and a watertight seal interposed between said plates, the plate closest to said one end of said stem being formed with a peripheral thread engageable with a mating thread formed near the bottom of said funnel.

* * * * *